United States Patent
Higo et al.

(10) Patent No.: US 11,368,389 B2
(45) Date of Patent: Jun. 21, 2022

(54) DATA TRANSFER METHOD, DATA TRANSFER DEVICE AND PROGRAM

(71) Applicant: Nippon Telegraph and Telephone Corporation, Tokyo (JP)

(72) Inventors: Naoki Higo, Tokyo (JP); Toshimitsu Tsubaki, Tokyo (JP); Yoshiko Sueda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 169 days.

(21) Appl. No.: 16/968,063

(22) PCT Filed: Feb. 7, 2019

(86) PCT No.: PCT/JP2019/004505
§ 371 (c)(1),
(2) Date: Aug. 6, 2020

(87) PCT Pub. No.: WO2019/159824
PCT Pub. Date: Aug. 22, 2019

(65) Prior Publication Data
US 2021/0399980 A1  Dec. 23, 2021

(30) Foreign Application Priority Data
Feb. 15, 2018  (JP) .............................. JP2018-025425

(51) Int. Cl.
*H04L 45/24* (2022.01)
*H04L 69/04* (2022.01)
*H04L 67/12* (2022.01)

(52) U.S. Cl.
CPC .............. *H04L 45/24* (2013.01); *H04L 69/04* (2013.01); *H04L 67/12* (2013.01)

(58) Field of Classification Search
None
See application file for complete search history.

(56) References Cited

U.S. PATENT DOCUMENTS

2005/0100049 A1* 5/2005 Siminoff ................. H04L 45/24
370/473
2020/0382243 A1* 12/2020 Li .......................... H04W 76/15

FOREIGN PATENT DOCUMENTS

JP  201187091  4/2011
JP  2017158115  9/2017

OTHER PUBLICATIONS

Ford et al., "TCP Extensions for Multipath Operation with Multiple Addresses," Internet Engineering Task Force (IETF). Jan. 2013, 65 pages.

(Continued)

*Primary Examiner* — Robert M Morlan
(74) *Attorney, Agent, or Firm* — Fish & Richardson P.C.

(57) ABSTRACT

Communication quality is improved by performing, with a computer, determining whether redundancy of a communication path is necessary or not and a compression level of data based on communication quality associated with transfer of the data; compressing data to be transferred in accordance with the compression level determined; and a transmission step of, when it is determined that redundancy of the communication path is necessary, making the communication path redundant and transmitting the data to each of the resulting communication paths.

15 Claims, 6 Drawing Sheets

KEY DATA `ABCABCABCAAAABCABCABCBBBABC`

COMPRESSION TARGET DATA `ABCABCABCXXXABCABCYBCBBZZBC`
⇩ COMPARE ON PER-BYTE BASIS

EVALUATION ARRAY `000000000111000000100001100`
⇩

`ABCABCABCXXXABCABCYBCBBZZBC`
⇩ SWITCHED RUN-LENGTH CODING

CODE DATA `93XXX61Y42Z2`

CODE DATA `93XXX61Y42Z2`
⇩

KEY DATA `ABCABCABCAAAABCABCABCBBBABC`
⇩ DECODING

COMPRESSION TARGET DATA `ABCABCABCXXXABCABCYBCBBZZBC`

(56) References Cited

OTHER PUBLICATIONS

Singh et al., "Multipath RTP (MPRTP) Draft-Singb-Avtcore-Mprtp-08," AVT Core Working Group, Jan. 13, 2014, 36 pages.

* cited by examiner (1)

(2)

DATA TRANSFER METHOD, DATA TRANSFER DEVICE AND PROGRAM

CROSS-REFERENCE TO RELATED APPLICATIONS

This application is a National Stage application under 35 U.S.C. § 371 of International Application No. PCT/JP2019/004505, having an International Filing Date of Feb. 7, 2019, which claims priority to Japanese Application Serial No. 2018-025425, filed on Feb. 15, 2018. The disclosure of the prior application is considered part of the disclosure of this application, and is incorporated in its entirety into this application

TECHNICAL FIELD

The present invention relates to a data transfer method, a data transfer apparatus, and a program.

BACKGROUND ART

It has been ascertained that for control of a drone or a robot arm, control information data such as joint angle information or movement speed information is transferred bi-directionally at short time intervals on the order of several milliseconds to a dozen or so milliseconds. Also, with the emergence of devices such as cameras that generate numerical data representing a result of analysis on video or sound (e.g., the number of people present in video), it is expected that video or sound is analyzed and numerical data representing the results of analysis is transferred at short time intervals.

Comparison of data before and after such a transfer shows that they often have many overlapping portions. Due to the fact that information to be exchanged differs from device to device, on the other hand, building a codec intended for a common format like with video or sound is expected to be difficult, and creating an information compression method for each individual device can incur development cost. In terms of controlling IoT devices, however, reliability of reaching and reduction of delay are required.

As delay is high and reachability is poor with a single path alone, utilization of MPTCP (MultiPath TCP) (Non-Patent Literature 1), MPRTP (Multipath RTP) (Non-Patent Literature 2), or carrier aggregation is conceivable.

CITATION LIST

Non-Patent Literature

Non-Patent Literature 1: rfc6824
Non-Patent Literature 2: draft-singh-avtcore-mprtp-08

SUMMARY OF THE INVENTION

Technical Problem

However, MPTCP has low communication efficiency because duplicated data is sent to all communication channels. In conventional MPRTP and carrier aggregation techniques, paths are made redundant but data is not duplicated, so that delay is high and reachability is poor.

The present invention has been made in view of the foregoing and an object of the present invention is to improve communication quality.

Means for Solving the Problem

To attain the object, a computer performs a determination step of determining whether redundancy of a communication path is necessary or not and a compression level of data based on communication quality associated with transfer of the data; a compression step of compressing data to be transferred in accordance with the compression level; and when it is determined that redundancy of the communication path is necessary in the determination step, making the communication path redundant and transmitting the data to each of the resulting communication paths.

Effects of the Invention

Communication quality can be improved.

DESCRIPTION OF EMBODIMENTS

Figure 1:
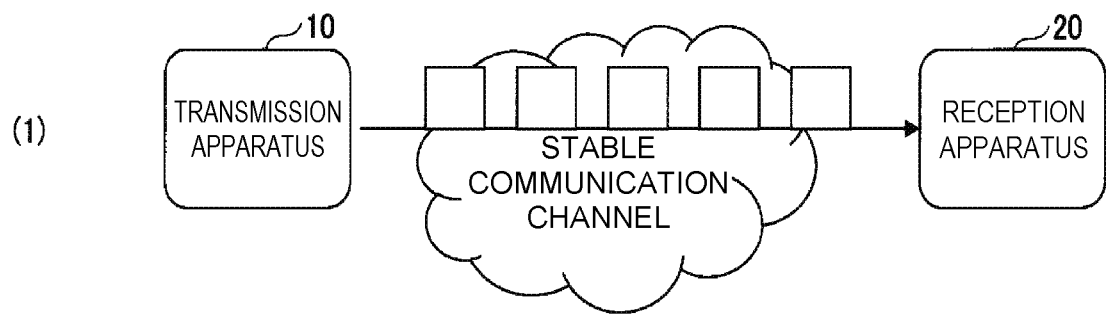
FIG. 1 is a diagram for generally describing an embodiment of the present invention.
Figure 1:
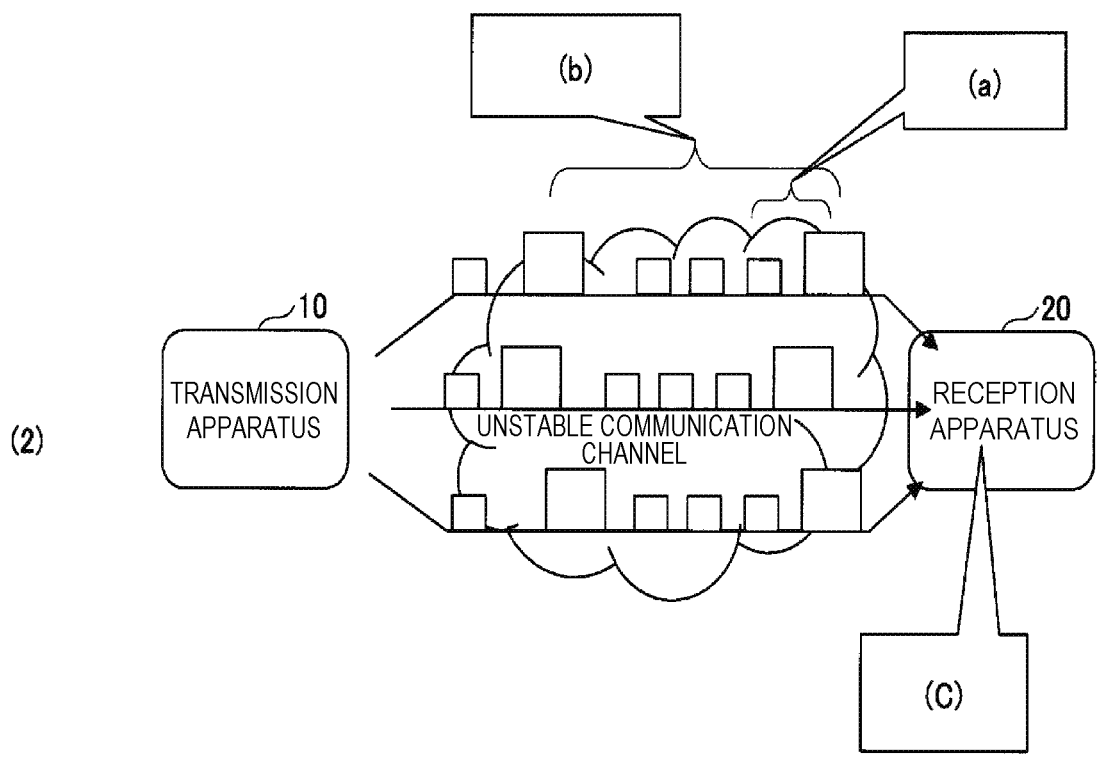

Embodiments of the present invention are now described with reference to the drawings. FIG. 1 is a diagram for generally describing an embodiment of the present invention. In FIG. 1, a transmission apparatus 10 is a device or a computer such as a server that transmits data containing control information for a device, for example, at short time intervals. A reception apparatus 20 is a device or a computer such as a server that receives the data.

In FIG. 1, (1) shows data transfer when data transfer between the transmission apparatus 10 and the reception apparatus 20 is stable. In this case, data is transferred in its original data volume (without the data being compressed) over a single communication path. The sizes of the rectangles on the arrow from the transmission apparatus 10 to the reception apparatus 20 indicate a data volume in a payload portion of one packet, for example.

(2) shows data transfer when data transfer between the transmission apparatus 10 and the reception apparatus 20 is unstable. Data transfer being unstable refers to a state having variable throughput, high packet loss, or high jitters.

In this case, measures shown at (a) to (c) in the figure are effected. The meanings of (a) to (c) are as follows:

(a) Reduce communication traffic by transferring only a difference from key data (hereinafter, referred to as "inter-data compression"). Here, key data is data that serves as a reference in the extraction of inter-data difference and refers to uncompressed data. That is, key data is data equivalent to a key frame in video data (I frame in H.264), for example.

(b) Make the communication path and data (stream) redundant to improve the reachability, because if the interval of transmission of key data is long, data does not reach when a packet is lost and the operation of the reception apparatus 20 will become unstable. Making data redundant means sending duplicate of the data (i.e., the same data) to each communication path.

(c) Select the data that has reached first among the redundant data to achieve low delay.

As mentioned above, this embodiment reduces communication traffic by applying inter-data compression since packets will overflow when data transfer is unstable, and also makes the communication path and data redundant since inter-data compression leads to susceptibility to packet loss. By thus adjusting inter-data compression and redundancy of the communication paths and data with respect to unstable data transfer, efficient communication, high reliability of reaching, and low delay are achieved.

Figure 2:
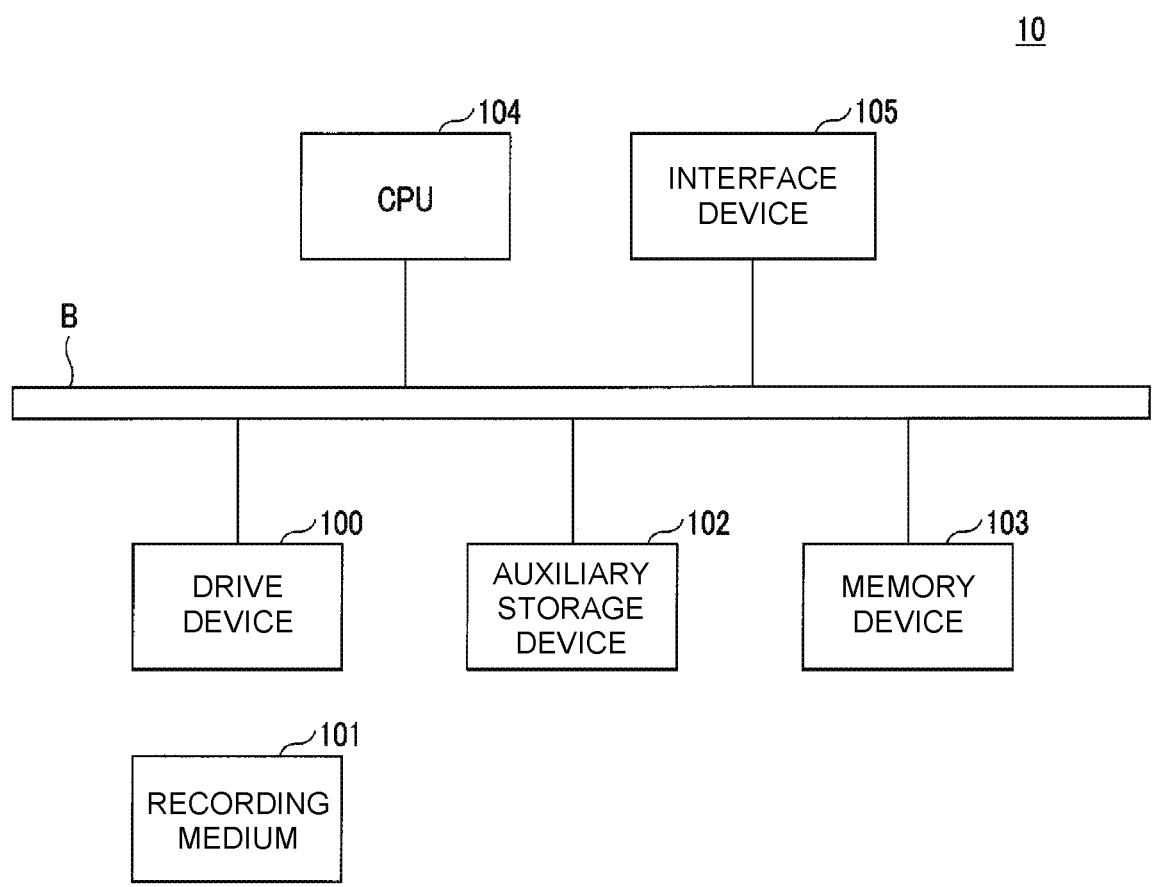
FIG. 2 shows an exemplary hardware configuration of a transmission apparatus 10 in an embodiment of the present invention.

FIG. 2 shows an exemplary hardware configuration of the transmission apparatus 10 in an embodiment of the present invention. The transmission apparatus 10 of FIG. 2 includes a drive device 100, an auxiliary storage device 102, a memory device 103, a CPU 104, and an interface device 105, which are interconnected by a bus B.

A program that implements processing at the transmission apparatus 10 is provided through a recording medium 101 such as a CD-ROM or the like. When the recording medium 101 storing the program therein is set into the drive device 100, the program is installed from the recording medium 101 into the auxiliary storage device 102 via the drive device 100. The installation of the program, however, does not have to be done from the recording medium 101; the program may be downloaded from another computer over a network. The auxiliary storage device 102 stores the installed program and also stores necessary files and data.

The memory device 103 reads the program from the auxiliary storage device 102 and stores it when a command to activate the program is given. The CPU 104 executes functions associated with the transmission apparatus 10 in accordance with the program stored in the memory device 103. The interface device 105 is used as an interface for connecting to a network. Note that the transmission apparatus 10 has multiple interface devices 105 for enabling connection to multiple communication paths.

The reception apparatus 20 also has the hardware configuration shown in FIG. 2.

Figure 3:
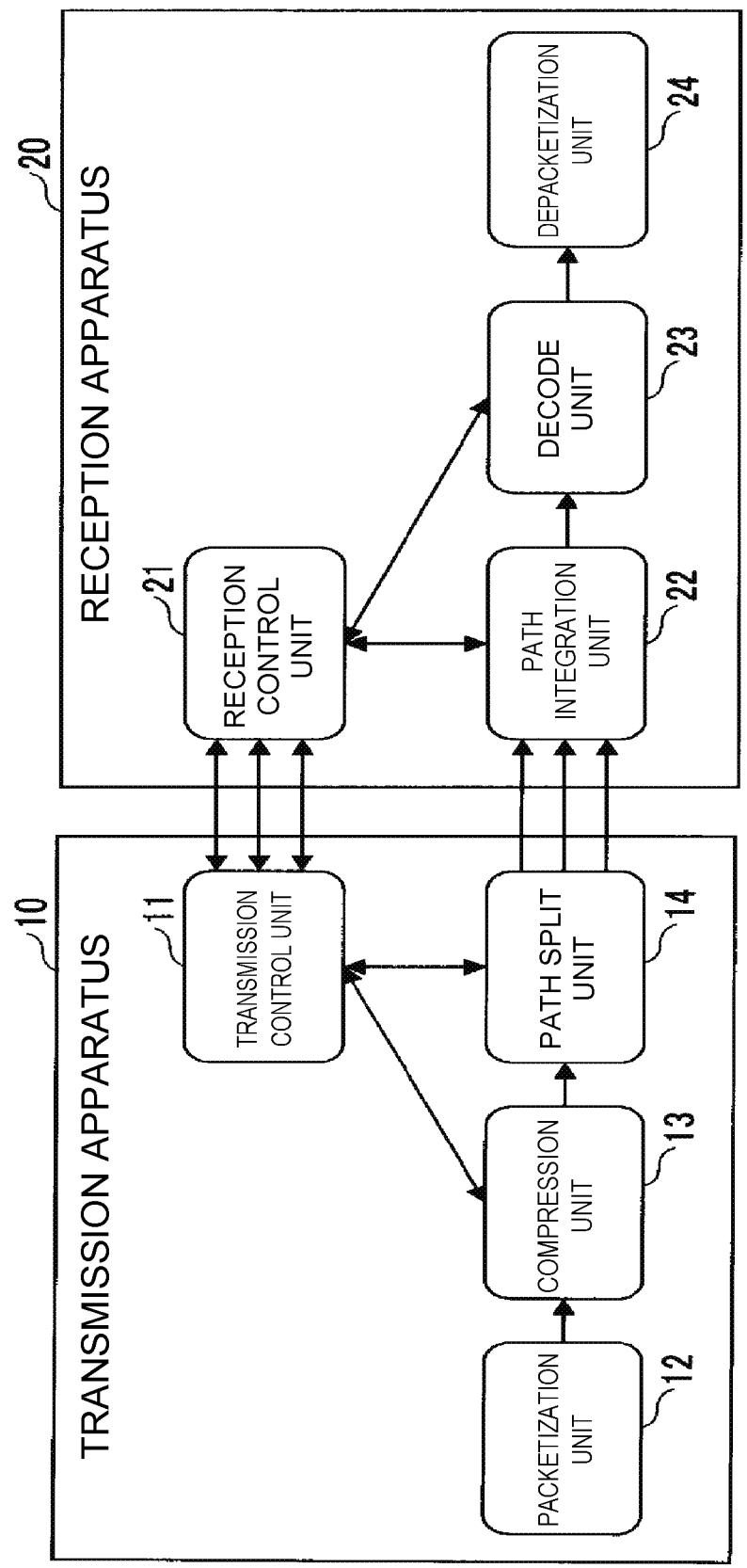
FIG. 3 shows an exemplary functional configuration of the transmission apparatus 10 and a reception apparatus 20 in an embodiment of the present invention.

FIG. 3 shows an exemplary functional configuration of the transmission apparatus 10 and the reception apparatus 20 in an embodiment of the present invention. In FIG. 3, the transmission apparatus 10 includes a transmission control unit 11, a packetization unit 12, a compression unit 13, and a path split unit 14. These components are embodied by processing that one or more programs installed in the transmission apparatus 10 causes the CPU 104 to execute. The reception apparatus 20 includes a reception control unit 21, a path integration unit 22, a decode unit 23, and a depacketization unit 24. These components are embodied by processing that one or more programs installed in the reception apparatus 20 causes the CPU of the reception apparatus 20 to execute.

The transmission control unit 11 adjusts (determines) the necessity of redundancy of the communication path or the necessity of reducing the communication paths, and the interval of key data (compression level), based on feedback of communication quality associated with data transfer transmitted from the reception control unit 21 by, for example, RTCP (Real-time Transport Control). When determining that redundancy of the communication path or reduction of the communication paths is necessary, the transmission control unit 11 notifies the path split unit 14 that redundancy of the communication path or reduction of the communication paths is necessary. The transmission control unit 11 also notifies the compression unit 13 of the compression level.

The packetization unit 12 generates packets corresponding to a protocol, e.g., RTP (Real-time Transport Protocol), for a data group to be transmitted (to be transferred).

The compression unit 13 performs inter-data compression on the payload portion of each packet based on the difference from the payload portion of the packet as key data. The compression unit 13 sets every packet at the intervals of the compression level (the number of packets) indicated from the transmission control unit 11 as key data, and adds a code indicative of being key data to a header and the like of the packet. For example, when RTP is employed, a flag may be set in a mark field in an RTP header of a packet associated with key data.

The path split unit 14 makes the communication path redundant or reduces the communication paths in accordance with the notification from the transmission control unit 11, and duplicates and sends packets to each communication path. That is, not only the communication paths but data are made redundant.

The path integration unit 22 receives the data (packets) transmitted from the transmission apparatus 10. When the communication paths have been made redundant, the path integration unit 22 thins (discards) overlapping packets, thereby integrating packets so that packets from the multiple communication paths do not overlap. For example, among the overlapping packets, the second and subsequent received packets may be discarded. The path integration unit 22 also notifies (reports) communication quality information (jitter, data loss rate, throughput, etc.) for each communication path to the reception control unit 21.

The decode unit 23 eliminates reversal of the order of packets and the like, and decodes (decompresses) packets (payload portions) that have been compressed by inter-data compression.

The depacketization unit 24 reconstructs data from packets.

The reception control unit 21 notifies the path integration unit 22 of redundancy or reduction of the communication paths in response to the notification on redundancy or reduction of the communication paths from the transmission control unit 11, for example. The reception control unit 21 also transmits communication quality information (jitter, data loss rate, throughput, etc.) from the path integration unit 22 to the transmission control unit 11 based on a protocol such as RTCP, for example.

Figure 4:
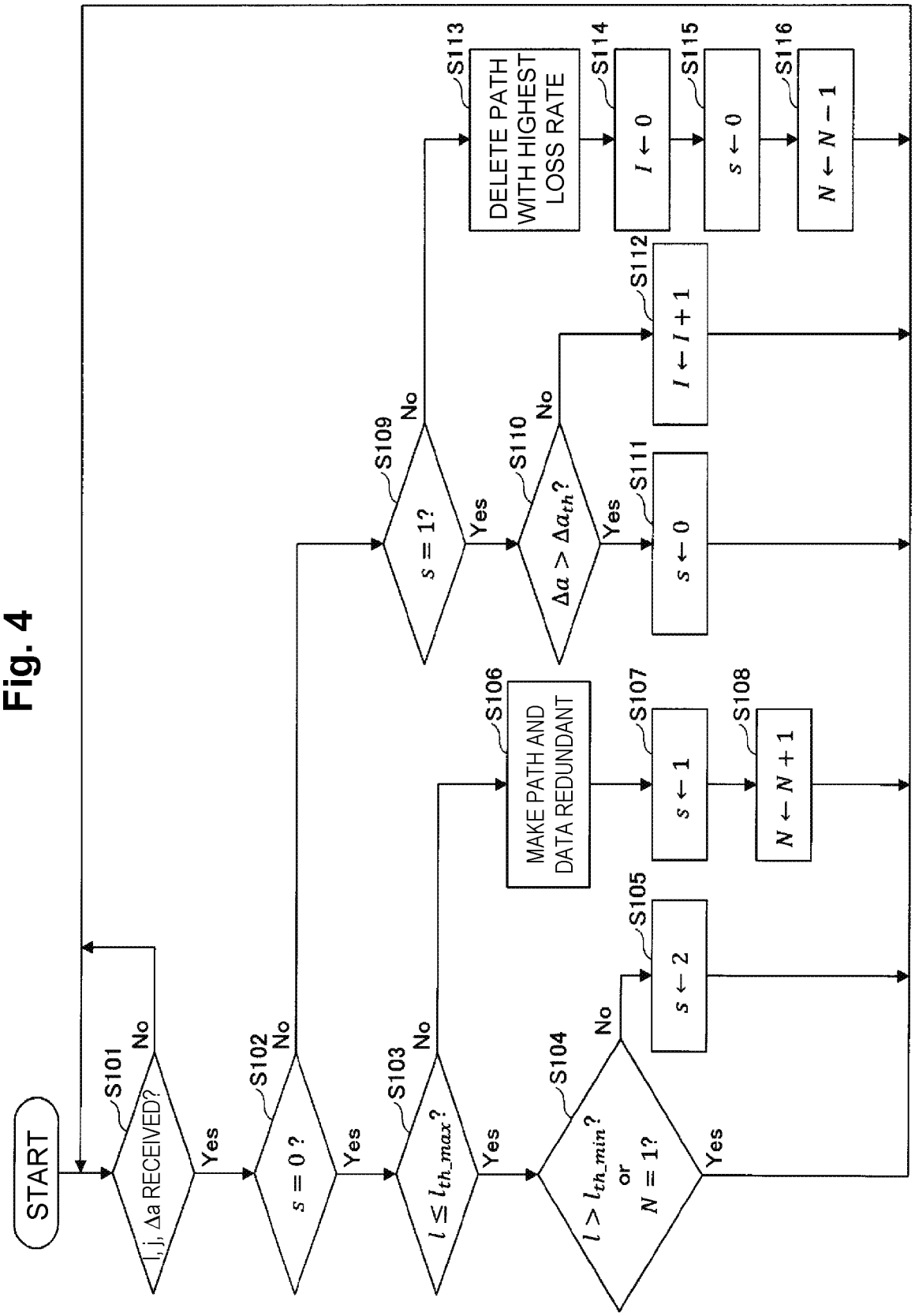
FIG. 4 is a diagram for describing an example of the processing procedure performed by a transmission control unit 11.

A processing procedure performed by the transmission control unit 11 is described below. FIG. 4 is a diagram for describing an example of the processing procedure performed by the transmission control unit 11. The meanings of the symbols in FIG. 4 are:

l: an aggregate data loss rate for all the paths notified from the reception control unit 21 j: an aggregate jitter for all the paths notified from the reception control unit 21 a: an aggregate throughput (bps) for all the paths notified from the reception control unit 21

$\Delta a$: the absolute value of the amount of change in a s: state (s={0, 1, 2})

$l_{th\_max}$: an upper threshold for the data loss rate $l_{th\_min}$ a lower threshold for the data loss rate $\Delta a_{th}$: a threshold on the amount of change in a
I: compression level (key data interval)
N: the number of communication paths When the transmission control unit 11 receives the communication quality information (data loss rate l, jitter j, throughput a, etc.) transmitted from the reception control unit 21 (Yes at S101), it determines whether state s is 0 (normal state) or not (S102).

When the state s is 0 (Yes at S102), the transmission control unit 11 determines whether the data loss rate l is equal to or lower than the upper threshold $l_{th\_max}$ (S103). When data loss rate l is equal to or lower than the upper threshold $l_{th\_max}$ (Yes at S103), the transmission control unit 11 determines whether a condition that the data loss rate l exceeds the lower threshold $l_{th\_min}$ or that the number of communication paths N is 1 (hereinafter referred to as "condition A") is satisfied or not (S104). When condition A is satisfied (Yes at S104), it returns to step S101. When condition A is not satisfied (No at S104), the transmission control unit 11 changes the state s to 2 (S105) and returns step S101. A status with the state s being 2 means a phase of reducing redundant paths.

When the data loss rate l exceeds the upper threshold $l_{th\_max}$ at step S103 (No at S103), the transmission control unit 11 instructs the path split unit 14 to make the communication path and data redundant (S106). As a result, the path split unit 14 adds one communication path (e.g., a socket for transmission) (makes the communication path redundant), and sends duplicate of data also to the added communication path. The redundant communication path may be assigned to a different IP address than that of the existing communication path (i.e., a different interface device 105) at the transmission apparatus 10. The redundancy (addition) of the communication paths may be notified to the path integration unit 22 from the path split unit 14 or notified to the reception apparatus 20 (the path integration unit 22) from the transmission control unit 11 through the reception control unit 21. Upon being notified that the communication paths have been made redundant, the path integration unit 22 opens a socket for reception in correspondence with the redundant communication path. The socket may be assigned to a different IP address than that of the existing communication path (i.e., a different interface device) at the reception apparatus 20.

Then, the transmission control unit 11 changes the state s to 1 (S107). A status with the state s being 1 means a phase of increasing the compression level when changing the number of communication paths. Next, the transmission control unit 11 adds 1 to the number of communication paths N.

When the state s is not 0 at step S102 (No at S102), the transmission control unit 11 determines whether the state s is 1 or not (S109). When the state s is 1 (Yes at SS109), the transmission control unit 11 determines whether the absolute value $\Delta a$ of the amount of change in the throughput a is greater than the threshold $\Delta a_{th}$ or not (S110). The absolute value $\Delta a$ may be the amount of change in the throughput a since the last reception of communication quality information or the amount of change in the throughput a within a certain time. When the absolute value $\Delta a$ of the amount of change is greater than the threshold $\Delta a_{th}$ (Yes at S110), the transmission control unit 11 changes the state s to 0 (S111), and returns to step S101. When the absolute value $\Delta a$ of the amount of change is equal to or less than the threshold $\Delta a_{th}$ (Yes at S110), the transmission control unit 11 adds 1 to the compression level I and notifies the compression unit 13 of the compression level I after the addition (S112), and returns to step S101. In this case, the compression unit 13 performs compression with the newly indicated compression level (key data interval). That is, the compression level is increased when the throughput is stable.

When the state s is 2 at step S109 (No at S109), the path split unit 14 is instructed to delete (close) the communication path with the highest data loss rate per communication path (S113). Note that communication quality information notified by the reception control unit 21 also contains values per communication path in addition to aggregate values for all the communication paths (i.e., communication paths including the redundant communication path as well). Thus, the transmission control unit 11 can identify the communication path with the highest data loss rate and instructs the path split unit 14 to delete that communication path. In this case, the path split unit 14 deletes the communication path (e.g., closes the socket corresponding to the communication path) to stop the sending of data to the communication path. The deletion of the communication path may be notified to the path integration unit 22 from the path split unit 14 or notified to the path integration unit 22 from the transmission control unit 11 via the reception control unit 21. Upon being notified about the deletion of the communication path, the path integration unit 22 closes the socket corresponding to the deleted communication path, for example.

Then, the transmission control unit 11 sets the compression level I to 0 (S114), and notifies the compression unit 13 of the compression level I after being changed to 0 (S114). In this case, the compression unit 13 ceases compressing data. The transmission control unit 11 then changes the state s to 0 (S115), subtracts 1 from the number of communication paths N (S116), and returns to step S101.

Figure 5:
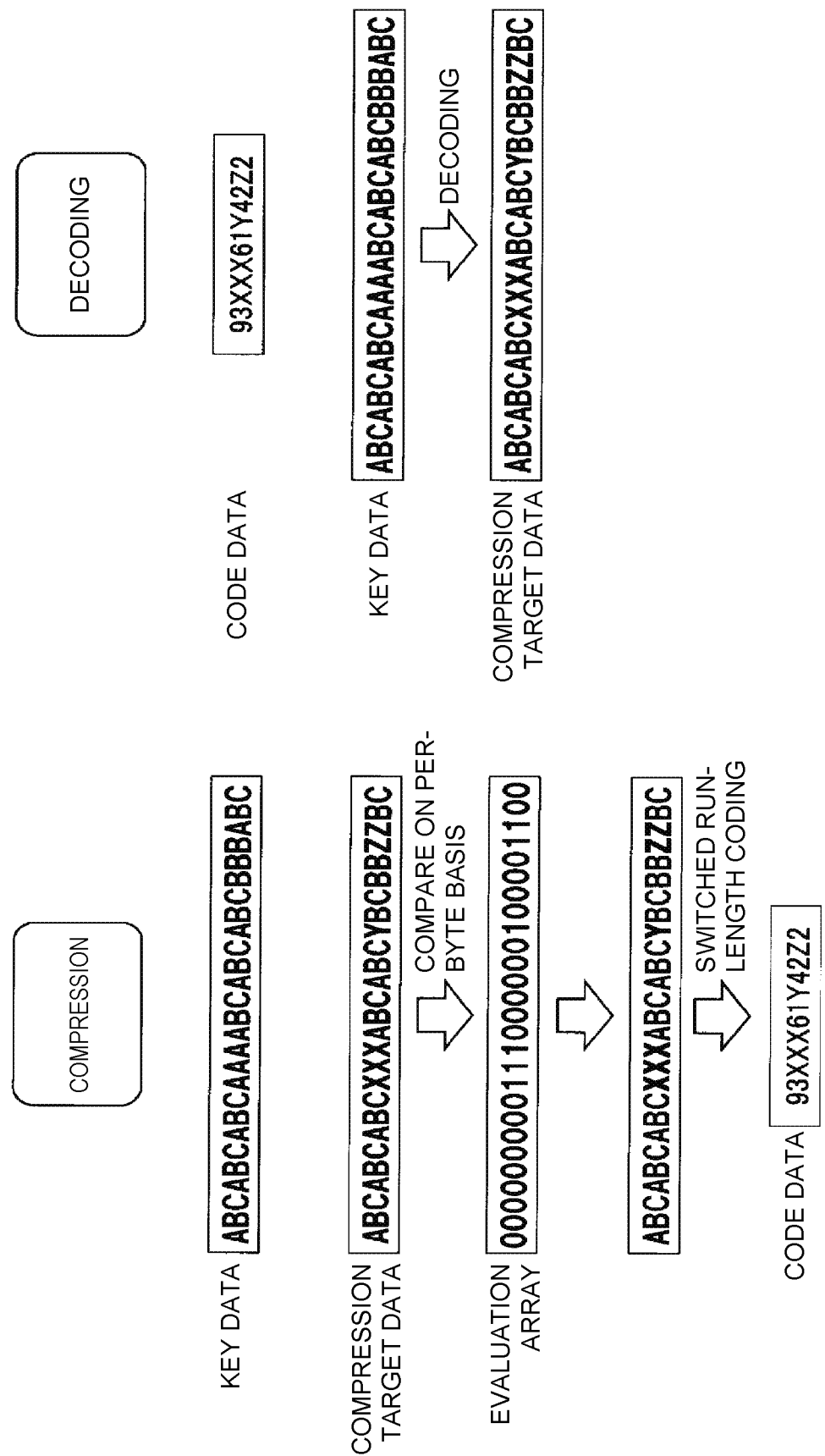
FIG. 5 is a diagram for describing an example of compression and decoding of data.

Compression and decoding of data may be performed as shown in FIG. 5, for example. FIG. 5 is a diagram for describing an example of compression and decoding of data.

In FIG. 5, the left side indicates the procedure of compression. In compression, key data and compression target data are compared to each other on a per-byte basis, and an array (evaluation array) evaluating the same portions and different portions of them is generated. The evaluation array in FIG. 5 represents the same bytes by 0 and different bytes by 1. Portions of the compression target data that correspond to 1 in the evaluation array are compressed by switched run-length coding to generate compressed data (code data).

In decoding, the code data is decoded based on the last key data preceding the code data and on the code data to reconstruct the compression target data.

Although the foregoing example describes that the payload portion of a packet is subjected to compression and decoding, data prior to packetization may be subjected to compression and decoding. In that case, at the transmission apparatus 10, compression by the compression unit 13 is performed first and then packetization by the packetization unit 12 is performed. At the reception apparatus 20, reconstruction by the depacketization unit 24 is performed first and then decoding by the decode unit 23 is performed.

As described above, this embodiment adjusts the data compression level and redundancy of data and communication paths in a balanced manner in unstable data transfer. As a result, efficient communication, high reliability of reaching, and low delay can be achieved. That is, communication quality can be improved.

Figure 6:
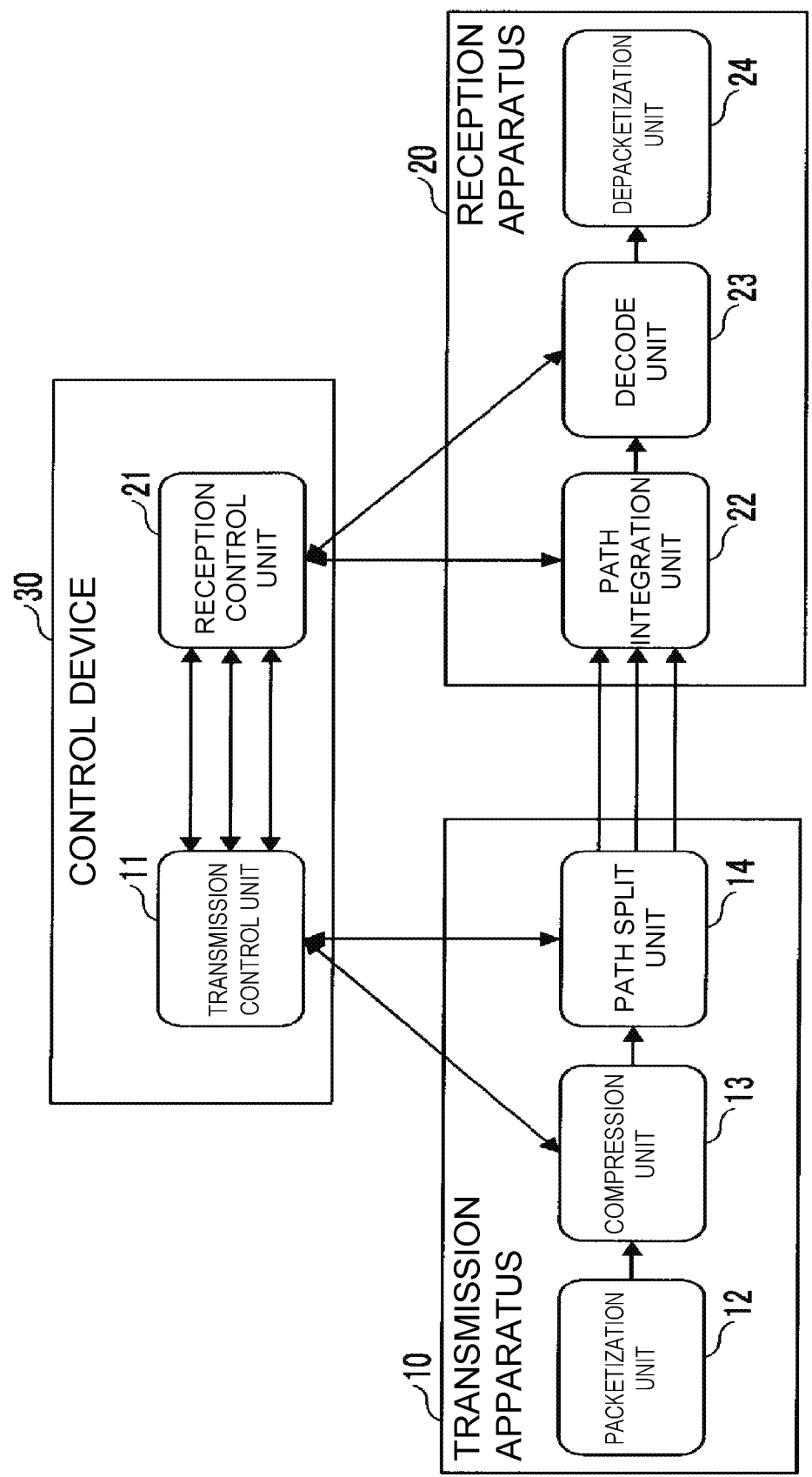
FIG. 6 shows a second exemplary functional configuration of the transmission apparatus 10 and the reception apparatus 20 in an embodiment of the present invention.

The components of the transmission apparatus 10 and the reception apparatus 20 described in FIG. 3 does not have to be contained in a single apparatus, respectively. Also, as shown in FIG. 6, the transmission control unit 11 and the reception control unit 21 may be contained in the same device (the control device in FIG. 6). Alternatively, either one of the transmission control unit 11 or the reception control unit 21 may combine the other.

In the above embodiment, the transmission control unit 11 is an example of the determination unit. The path split unit 14 is an example of the transmission unit. The transmission apparatus 10 is an example of the data transfer apparatus.

While the embodiments of the present invention have been described in detail, the present invention is not intended to be limited to such particular embodiments but various variations and modifications are possible within the scope of the present invention as set forth in the claims.

REFERENCE SIGNS LIST 10 transmission apparatus
11 transmission control unit
12 packetization unit
13 compression unit
14 path split unit
20 reception apparatus
21 reception control unit
22 path integration unit
23 decode unit
24 depacketization unit
100 drive device
101 recording medium
102 auxiliary storage device
103 memory device
104 CPU
105 interface device
B bus

The invention claimed is:

1. A data transfer method comprising performing, by a computer:
determining whether redundancy of a communication path is necessary or not and a compression level of data based on communication quality associated with transfer of the data;
compressing data to be transferred in accordance with the compression level; and
when it is determined that the redundancy of the communication path is necessary, making the communication path redundant and transmitting the data to each of resulting redundant communication paths.

2. The data transfer method according to claim 1, wherein compressing the data to be transferred comprises:
performing compression based on an inter-data difference, and
the compression level is an interval of data that serves as a reference for the inter-data difference.

3. The data transfer method according to claim 1, wherein determining the compression level comprises:
increasing the compression level when an amount of change in throughput in the transfer is equal to or less than a threshold.

4. The data transfer method according to claim 1, wherein determining whether the redundancy of a communication path is necessary or not comprises:
determining that the redundancy of the communication path is necessary when a data loss rate in the transfer exceeds a threshold.

5. The data transfer method according to claim 1, further comprising:
determining whether reduction of the communication paths is necessary or not based on the communication quality when the communication paths have been made redundant, and
when determining that the reduction of the communication paths is necessary, reducing the redundant communication paths and transmitting the data.

6. A data transfer apparatus comprising:
a determination unit, including one or more processors, that determines whether redundancy of a communication path is necessary or not and a compression level of data based on communication quality associated with transfer of the data;
a compression unit, including one or more processors, that compresses data to be transferred in accordance with the compression level determined by the determination unit; and
a transmission unit, including one or more processors, that, when the determination unit determines that the redundancy of the communication path is necessary, makes the communication path redundant and transmits the data to each of resulting redundant communication paths.

7. The data transfer apparatus according to claim 6, wherein
the compression unit performs compression based on an inter-data difference, and
the compression level is an interval of data that serves as a reference for the inter-data difference.

8. The data transfer apparatus according to claim 6, wherein the determination unit increases the compression level when an amount of change in throughput in the transfer is equal to or less than a threshold.

9. The data transfer apparatus according to claim 6, wherein the determination unit determines that the redundancy of the communication path is necessary when a data loss rate in the transfer exceeds a threshold.

10. The data transfer apparatus according to claim 6, wherein
the determination unit determines whether reduction of the communication paths is necessary or not based on the communication quality when the communication paths have been made redundant, and
when the determination unit determines that the reduction of the communication paths is necessary, the transmission unit reduces the redundant communication paths and transmits the data.

11. A non-transitory computer readable medium storing one or more instructions causing a computer to execute:
determining whether redundancy of a communication path is necessary or not and a compression level of data based on communication quality associated with transfer of the data;
compressing data to be transferred in accordance with the compression level; and
when it is determined that the redundancy of the communication path is necessary, making the communication path redundant and transmitting the data to each of resulting redundant communication paths.

12. The non-transitory computer readable medium according to claim 11, wherein compressing the data to be transferred comprises:
performing compression based on an inter-data difference, and
the compression level is an interval of data that serves as a reference for the inter-data difference.

13. The non-transitory computer readable medium according to claim 11, wherein determining the compression level comprises:

increasing the compression level when an amount of change in throughput in the transfer is equal to or less than a threshold.

14. The non-transitory computer readable medium according to claim 11, wherein determining whether the redundancy of a communication path is necessary or not comprises:
   determining that the redundancy of the communication path is necessary when a data loss rate in the transfer exceeds a threshold.

15. The non-transitory computer readable medium according to claim 11, wherein the one or more instructions further comprise:
   determining whether reduction of the communication paths is necessary or not based on the communication quality when the communication paths have been made redundant, and
   when determining that the reduction of the communication paths is necessary, reducing the redundant communication paths and transmitting the data.

* * * * *